United States Patent
Fujiwara

[19]

[11] Patent Number: 6,016,567
[45] Date of Patent: Jan. 18, 2000

[54] RADIO BROADCAST SYSTEM WITH IMPROVED RECEPTION OF AN NAK CODE

[75] Inventor: Ryuhei Fujiwara, Tokyo, Japan

[73] Assignee: NEC Corporation, Japan

[21] Appl. No.: 08/975,596

[22] Filed: Nov. 21, 1997

[30] Foreign Application Priority Data

Nov. 25, 1996 [JP] Japan .................................. 8-313165

[51] Int. Cl.[7] .................................................. H04L 1/18
[52] U.S. Cl. .................................................. 714/748
[58] Field of Search .................................. 714/746, 747, 714/748, 749

[56] References Cited

U.S. PATENT DOCUMENTS 5,517,507  5/1996  Needham et al. ...................... 371/32
5,636,230  6/1997  Marturano et al. ...................... 371/32

FOREIGN PATENT DOCUMENTS 817417    1/1998  European Pat. Off. .
63-129743 6/1988  Japan .
63-246938 10/1988 Japan .
2287383   9/1995  United Kingdom .

*Primary Examiner*—Paul P. Gordon
*Attorney, Agent, or Firm*—Ostrolenk, Faber, Gerb & Soffen, LLP

[57] ABSTRACT

In a radio broadcast system constituted by a base station and a plurality of subsidiary stations located at various portions around the base station, each subsidiary station includes a detection unit for detecting an error in received data, and a unit for transmitting a burst retransmission request signal (NAK signal) upon detecting an error in the received data, and transmits no signals for a predetermined limited time, except the NAK signal for indicating reception of broadcast data containing an error. The base station either detects the NAK signal within the limited time or regards detection of a radio carrier having a predetermined time length as detection of the NAK signal.

4 Claims, 3 Drawing Sheets

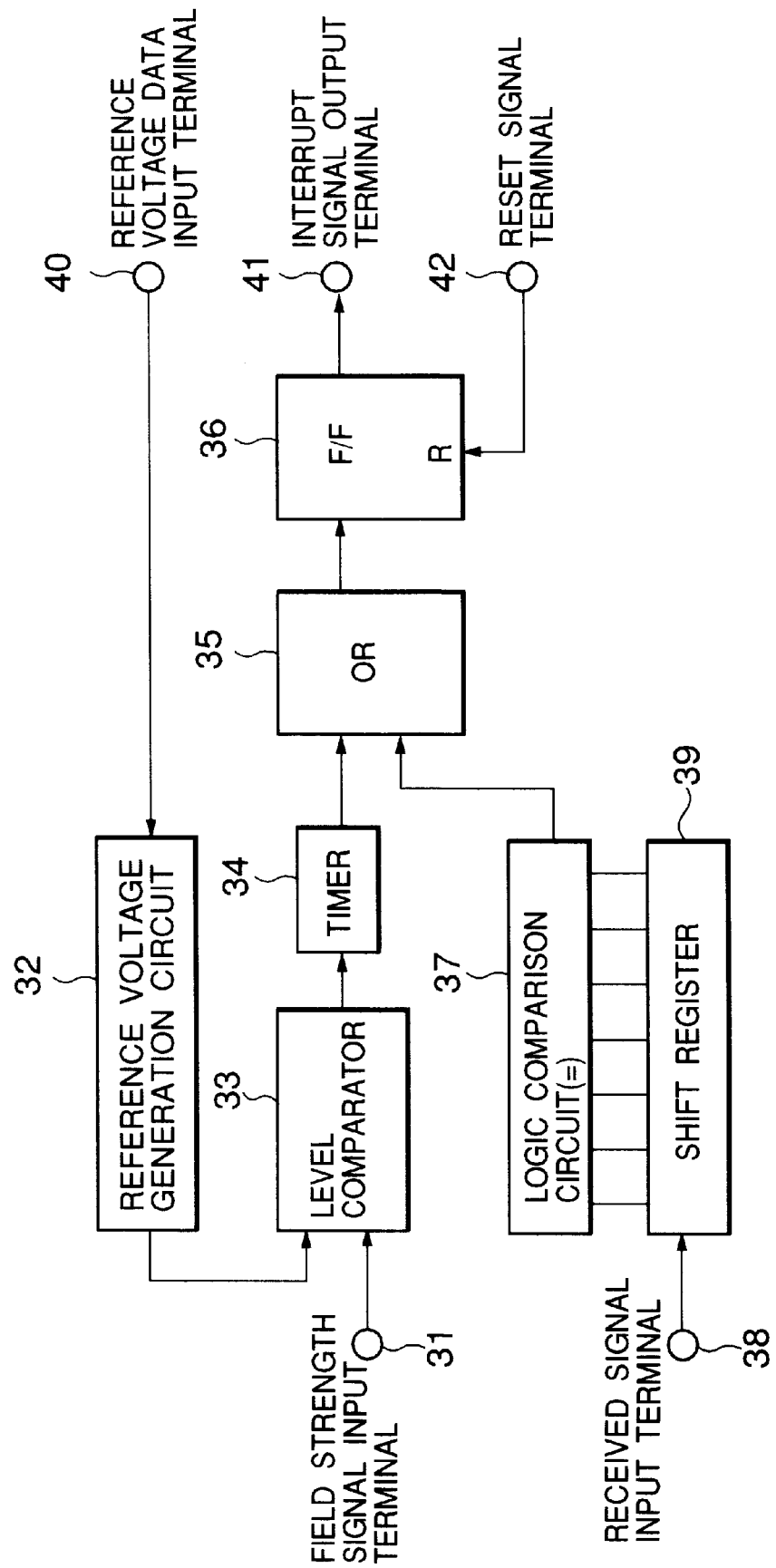

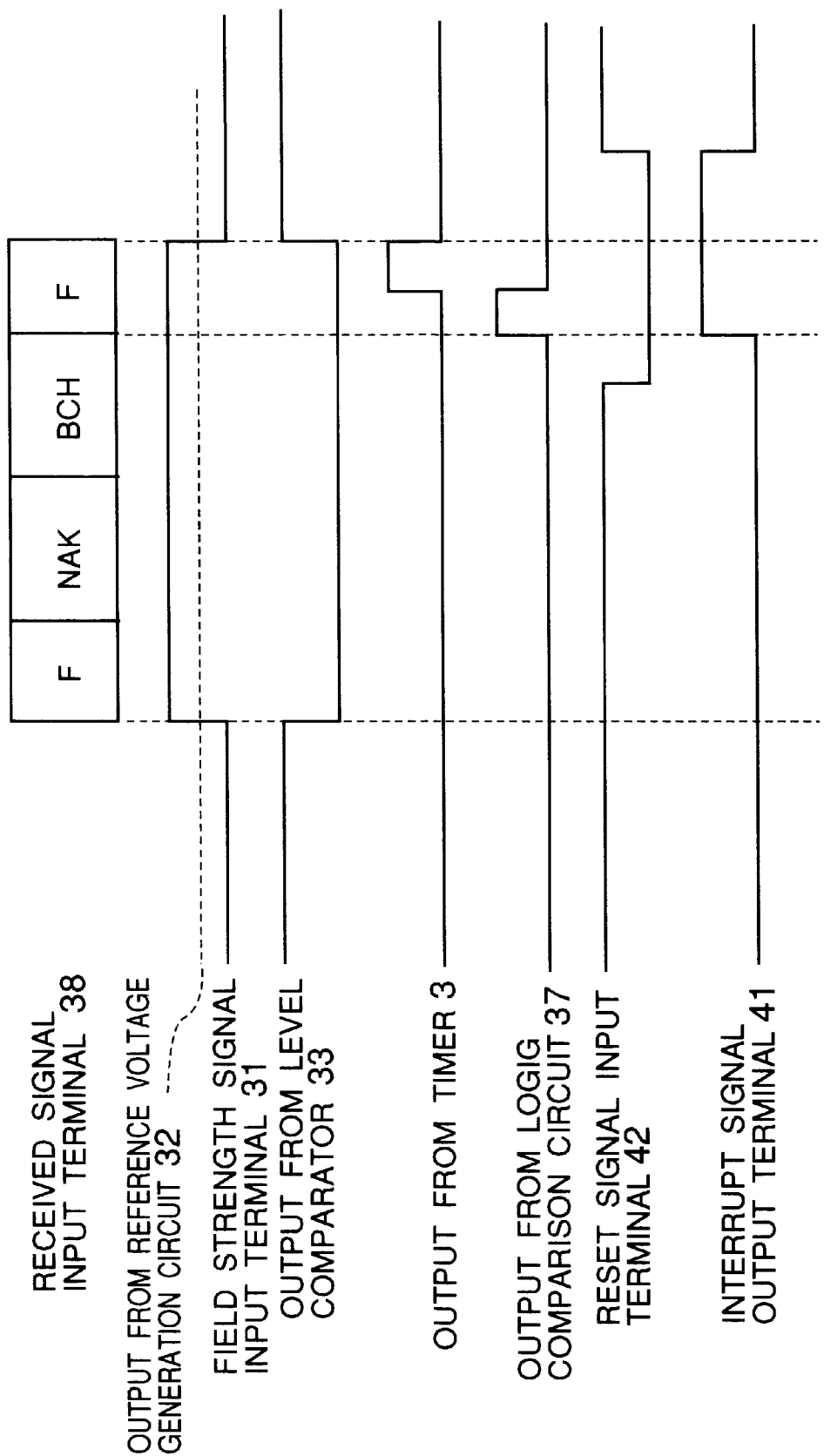

RADIO BROADCAST SYSTEM WITH IMPROVED RECEPTION OF AN NAK CODE

BACKGROUND OF THE INVENTION

1. Field of the Invention

The present invention relates to a radio broadcast system.

2. Description of the Prior Art

Conventionally, in some communication systems, arrangement have been put into practice to confirm arrival of information which has been broadcast by one base station to a plurality of subsidiary stations located around the base station. Examples of known methods are the polling method in which the base station sequentially inquires of all subsidiary stations about transmission, the ACK ("acknowledgement") method in which subsidiary stations which have properly received information make an answer, and the NAK ("negative acknowledgement") method of requiring data retransmission only in case of transmission failures.

Also proposed are a method wherein subsidiary stations which frequently issue a data retransmission request or make no response are removed from the service, thereby more efficiently broadcasting information to a plurality of subsidiary stations (improving the transmission throughput) (e.g., a method disclosed in Japanese Unexamined Patent Publication No. 63-129743), a method wherein identical data are transmitted a plurality of times to improve the communication quality, thereby making a transmission confirmation procedure such as ACK/NAK unnecessary (e.g., a method disclosed in Japanese Unexamined Patent Publication No. 63-246938).

In these prior art systems, a necessary condition for employment of the NAK method in radio broadcast is that the radio transmission state between the subsidiary stations and the base station must be so good that the transmission of the NAK signal need not be confirmed. If a subsidiary station which does not satisfy this condition is contained in the system, retransmission control is always performed for the subsidiary station, so the throughput of the entire system is lowered. To prevent such a decrease in throughput, generally, a means for removing from the service the subsidiary station which frequently generates an NAK signal, or a means for transmitting identical data a plurality of number of times to improve the communication quality, must be used together. In this case, the probability of reception of the NAK signal by the base station is an important parameter influencing the transmission capability and quality of the system. However, the NAK signal using a coding code defined in the system is conventionally processed like data and does not particularly take a measure for increasing the reception probability. Degradation in the NAK signal reception rate makes the base station erroneously determine that the broadcast data has been properly transmitted to all subsidiary stations. For this reason, the means for optimizing the transmission capability and quality of the system may not be normally selected.

SUMMARY OF THE INVENTION

The present invention has been made in consideration of the above situation, and has as its object to improve the NAK signal reception rate of a base station to permit the NAK method to be used in a radio system constituted by the base station and a plurality of subsidiary stations located around the base station.

In order to achieve the above object, according to a first aspect of the present invention, there is provided a radio broadcast system constituted by a base station and a plurality of subsidiary stations located at various locations around the base station, wherein each subsidiary station comprises detection means for detecting an error in received data, and means for transmitting a burst retransmission request signal (NAK signal) upon detecting an error in the received data, and wherein after receiving broadcast data, the subsidiary station transmits no signals for a limited time, except the NAK signal indicating an error in the received broadcast data, and during the limited time, the base station either detects the NAK signal, or regards detection of a radio carrier having a predetermined duration as detection of the NAK signal.

According to a second aspect of the present invention, all the subsidiary stations use a unique code for the NAK signal.

According to a third aspect of the present invention, the subsidiary station transmits no signals except the NAK signal for the predetermined time by using, as a trigger, reception of the broadcast data containing an error.

According to fourth aspect of the present invention, a transmission time of the NAK signal is managed by forming a periodic frame depending on the base station.

The subsidiary station has detection means for detecting an error in the received data, and means for transmitting the burst retransmission request signal (NAK signal) upon detecting an error from the received data. When broadcast data containing an error is received, the NAK signal is transmitted within a permitted time. On the other hand, the base station has NAK signal detection means, and means for counting the time during which the NAK signal is expected. The base station monitors the NAK signal only within the expected reception time.

The NAK signal detection means is constituted by means for processing/detecting modulated data, e.g., means for performing error detection/correction and majority-receiving transmitted data having the same NAK signal code, and means for measuring the received field strength at the base station and a timer, for detecting when the received field strength during the predetermined time exceeds a predetermined value.

The reception rate can also be increased by defining a unique code for the NAK signal in units of base stations.

In view of the above features of the invention, even in case of congestion, the NAK signal can be properly received by the base station with a high probability depending on the congestion time relationship as long as the plurality of subsidiary stations use the same code for the NAK signal. Even when an error is generated in the received data by congestion because of the time relationship, to start retransmission processing or perform statistical processing of system reliability or the like, the base station need not know the subsidiary station which has transmitted the NAK signal.

In summary, in the base station of the present invention, the means for counting the expected reception time in which the NAK signal is likely to be received from the subsidiary station starts its counting operation triggered by a broadcast (transmission) of data. While counting, the NAK signal detection means detects the NAK signal as a result of processing signals received by the base station. Alternatively, reception of a radio wave having a predetermined duration time length measured by the timer is detected by measuring the received field strength and is regarded as equivalent to detection of the NAK signal. With this arrangement, the NAK signal reception rate can be increased, and the transmission quality of the system can be improved.

The transmission time of the NAK signal can be made to depend on the broadcast data, as described above. However, the transmission time can also be set according to a frame having a predetermined period.

As described above, according to the present invention, the subsidiary stations complying with a procedure of transmitting no signals except the NAK signal during the limited time given from the base station are combined with the base station which detects the NAK signal code during the limited time, or uses the means for determining detection of the NAK signal in accordance with the arrival of a radio carrier, to improve the NAK signal detection rate, so that a reliable radio broadcast system can be provided.

The above and additional objects, features and advantages of the present invention will become manifest to those skilled in the art upon making reference to the following detailed description and accompanying drawings in which a preferred embodiment incorporating the principle of the present invention is shown by way of an illustrative example.

BRIEF DESCRIPTION OF THE DRAWINGS

FIG. 3 is a block diagram showing a detailed arrangement of an NAK signal detection unit shown in FIG. 1; and FIG. 4 is a timing chart of signals in various portions of the NAK signal detection unit shown in FIG. 1.

DETAILED DESCRIPTION OF THE PREFERRED EMBODIMENT

A preferred embodiment of the present invention will be described below in detail with reference to the accompanying drawings.

Figure 1:
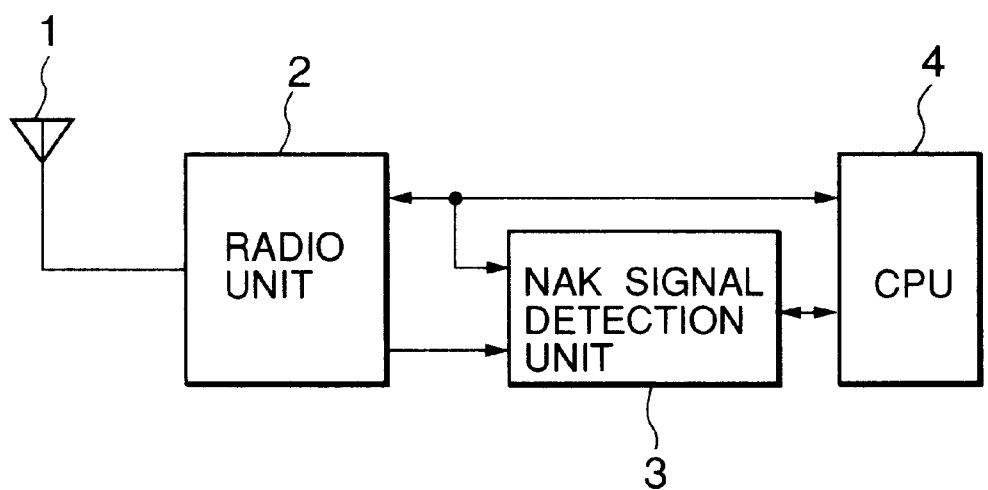
FIG. 1 is a block diagram of a base station in the embodiment of the present invention.

FIG. 1 is a block diagram showing the structure of a base station in the embodiment of the present invention.

As shown in FIG. 1, the base station comprises an antenna 1, a radio unit 2, an NAK signal detection unit 3, and a CPU 4. A radio wave from one subsidiary station (not shown) is input to the radio unit 2 via the antenna 1, demodulated, and subjected to error correction. Thereafter, only information is fetched by the CPU 4. The information is broadcast through the radio unit 2 as broadcast data, after an error correction code is added to the information by the CPU 4.

The NAK signal detection unit 3 receives the output after demodulation and error correction and the field strength signal of the received signal from the radio unit 2. The broadcast data transmitted from the antenna 1 is received by a plurality of subsidiary stations located around the base station.

Figure 2:
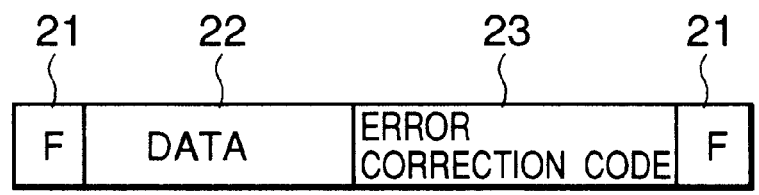
FIG. 2 is a view showing the format of a signal transferred between the base station and a subsidiary station in the embodiment of the present invention.

Data transmitted between the base station and a subsidiary station has a packet structure delimited by known codes (flags) 21, as shown in FIG. 2, and contains data 22 and an error correction code (e.g., a BCH code) 23. A radio carrier is also burst-transmitted according to this format. An NAK signal sent from the subsidiary station also has the same format, and the data 22 contains a code representing NAK. The NAK signal is also fetched by the CPU 4 but not transmitted back from the CPU 4.

FIG. 3 is a block diagram for explaining details of the NAK signal detection unit 3.

A field strength signal input from the radio unit 2 to a field strength input terminal 31 is compared, by a level comparator 33, with a reference voltage generated by a reference voltage generation circuit 32 on the basis of a value input from the CPU 4 through a reference voltage data input terminal 40.

When the field strength signal level is higher than the reference voltage, the output from the level comparator 33 cancels reset of a timer 34 to start the counting operation. After counting a predetermined time, the timer 34 generates a latch pulse. The latch pulse sets an RS flip-flop (F/F) 36 through an OR gate 35. With this series of operations, it is detected that a burst signal having at least a predetermined field strength and at least a predetermined duration has arrived from the subsidiary station.

On the other hand, a received signal which has undergone demodulation and error correction is input from the radio unit 2 to a shift register 39 through a received signal input terminal 38 and compared with the pattern of a code corresponding to the NAK signal in units of bits by a logic comparison circuit 37. When patterns match, the logic comparison circuit 37 generates a latch pulse to set the F/F 36 through the OR gate 35, as in field detection. A reset signal is supplied from the CPU 4 to the F/F 36 through a reset signal input terminal 42. The CPU 4 transmits back broadcast data, cancels reset only during an expected time in which the NAK signal is likely to be detected, and waits for set of the F/F 36.

FIG. 4 is a timing chart showing the input/output timings of the circuits shown in FIG. 3.

When the F/F 36 is set, the CPU 4 is "interrupted" through an interrupt signal output terminal 41, so that the CPU 4 is notified of reception of the NAK signal. If the expected time has elapsed without setting the F/F 36, it is determined that no NAK signal has been received. More specifically, the NAK signal detection unit 3 determines detection of the NAK signal when the NAK signal code is detected within the expected reception time, or when a radio carrier of the predetermined duration has arrived although the NAK signal code cannot be detected because of a transmission error beyond the error correction capability.

The operation of the NAK signal detection unit 3 is validated by defining, between the base station and the subsidiary stations, that no signals except the NAK signal are transmitted from the subsidiary stations for a predetermined time after transmission of the broadcast data from the base station. Alternatively, a time frame may be defined on the basis of the broadcast data to limit the NAK signal sending time.

The following methods can also be used to raise the NAK signal reception rate.

① NAK signal codes used by all subsidiary stations associated with one base station are unified. Even when a plurality of subsidiary stations almost equidistantly separated from the base station simultaneously transmit data, and field strengths arriving at the base station momentarily change in units of subsidiary stations to result in a drawing phenomenon for leaving only the strongest, a code representing NAK can be demodulated with a high probability.

② The effect can be further increased when a plurality of short codes representing NAK are set in the data portion of the NAK signal, and majority reception is made without error correction.

What is claimed is:

1. A radio broadcast system comprising a base station for transmitting data and a plurality of subsidiary stations located at various portions around said base station, wherein each subsidiary station comprises an error detector for detecting an error in received data, and a system for transmitting a burst retransmission request signal (NAK signal) upon detecting an error in the received data;

wherein, during a predetermined time, the transmitting system in the subsidiary station transmits no signals, except the NAK signal indicating reception of broadcast data containing an error, and during said predetermined time, if said base station detects the NAK signal or detects a radio carrier having a predetermined time length, said base station responds by retransmitting said data.

2. A system according to claim 1, wherein all said subsidiary stations use a code for the NAK signal.

3. A system according to claim 1, wherein said subsidiary station transmits no signals except the NAK signal for the predetermined time by using, as a trigger, reception of the broadcast data containing an error.

4. A system according to claim 1, wherein a transmission time of the NAK signal is managed by forming a periodic frame depending on said base station.

* * * * *